United States Patent
Cheung et al.

(10) Patent No.: US 7,664,618 B2
(45) Date of Patent: Feb. 16, 2010

(54) TREND MONITORING AND DIAGNOSTIC ANALYSIS METHOD AND SYSTEM FOR FAILURE PROTECTION AND FOR PREDICTIVE MAINTENANCE OF A VACUUM PUMP

(75) Inventors: Wan Sup Cheung, Daejeon (KR); Jong Yeon Lim, Daejeon (KR); Kwang Hwa Chung, Daejeon (KR); Soo Gab Lee, Seoul (KR)

(73) Assignee: Korea Research Institute of Standards and Science (KR)

( * ) Notice: Subject to any disclaimer, the term of this patent is extended or adjusted under 35 U.S.C. 154(b) by 248 days.

(21) Appl. No.: 11/721,939
(22) PCT Filed: Dec. 17, 2004
(86) PCT No.: PCT/KR2004/003329

§ 371 (c)(1),
(2), (4) Date: Jul. 6, 2007

(87) PCT Pub. No.: WO2006/064990

PCT Pub. Date: Jun. 22, 2006

(65) Prior Publication Data

US 2008/0010030 A1    Jan. 10, 2008

(51) Int. Cl.
*G21C 17/00*    (2006.01)

(52) U.S. Cl. .......... 702/183; 702/34; 702/189; 73/865.9; 340/500; 340/679; 377/16; 377/27

(58) Field of Classification Search ............ 702/34, 702/35, 182–184, 189; 73/865.9; 340/500, 340/679; 377/16, 27
See application file for complete search history.

(56) References Cited

U.S. PATENT DOCUMENTS

| | | | | |
|---|---|---|---|---|
| 6,917,839 | B2 * | 7/2005 | Bickford | 700/30 |
| 6,937,963 | B2 * | 8/2005 | Ishii et al. | 702/185 |
| 7,027,953 | B2 * | 4/2006 | Klein | 702/184 |
| 7,277,822 | B2 * | 10/2007 | Blemel | 702/183 |

* cited by examiner

*Primary Examiner*—Edward Raymond
*Assistant Examiner*—Elias Desta
(74) *Attorney, Agent, or Firm*—Steptoe & Johnson LLP

(57) ABSTRACT

The present invention such as active diagnostic algorithms is developed not only to realize the early detection of degraded vacuum pumps for the protection of pump failure but also to provide their predictive maintenance. According to the present invention, it is possible to find simple and effective ways to deal with technical problems arising from the large variability of the pump-by-pump operation characteristics and the multiple process conditions where pumps run under the idle operation and gas-loaded operation conditions alternately, especially in semiconductor manufacturing process.

11 Claims, 10 Drawing Sheets

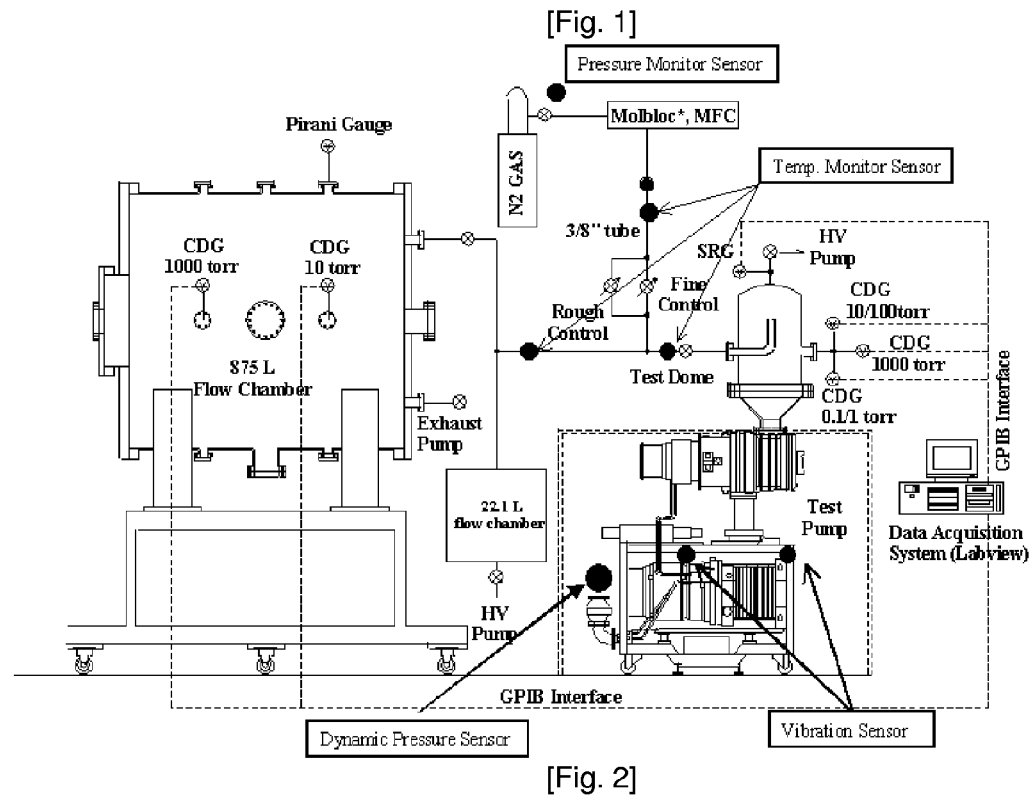
[Fig. 1]
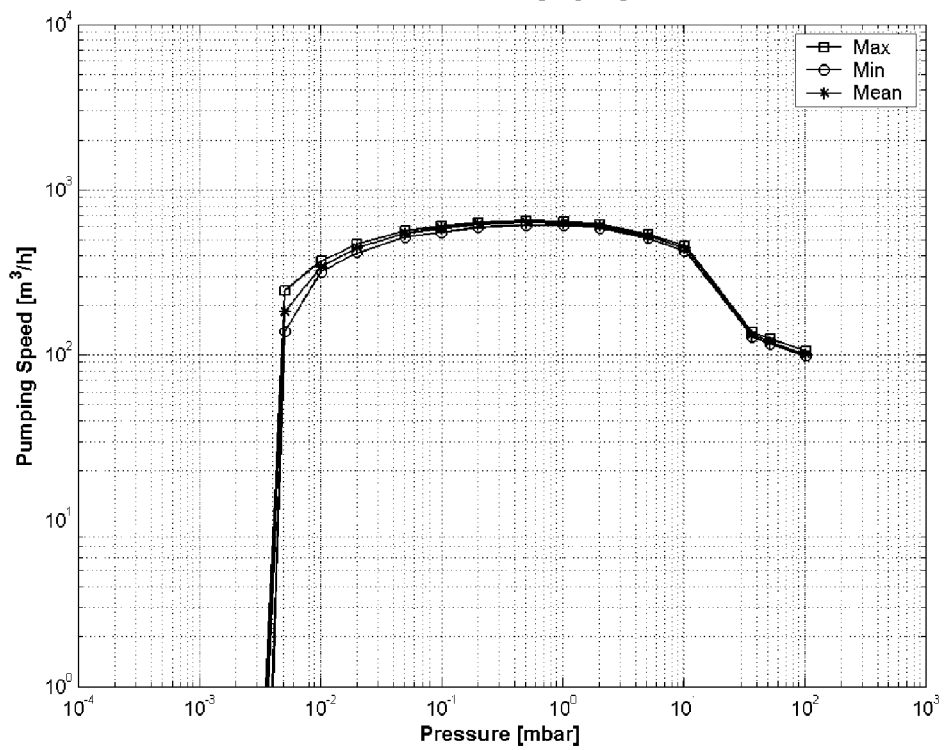
[Fig. 2]

[Fig. 3]
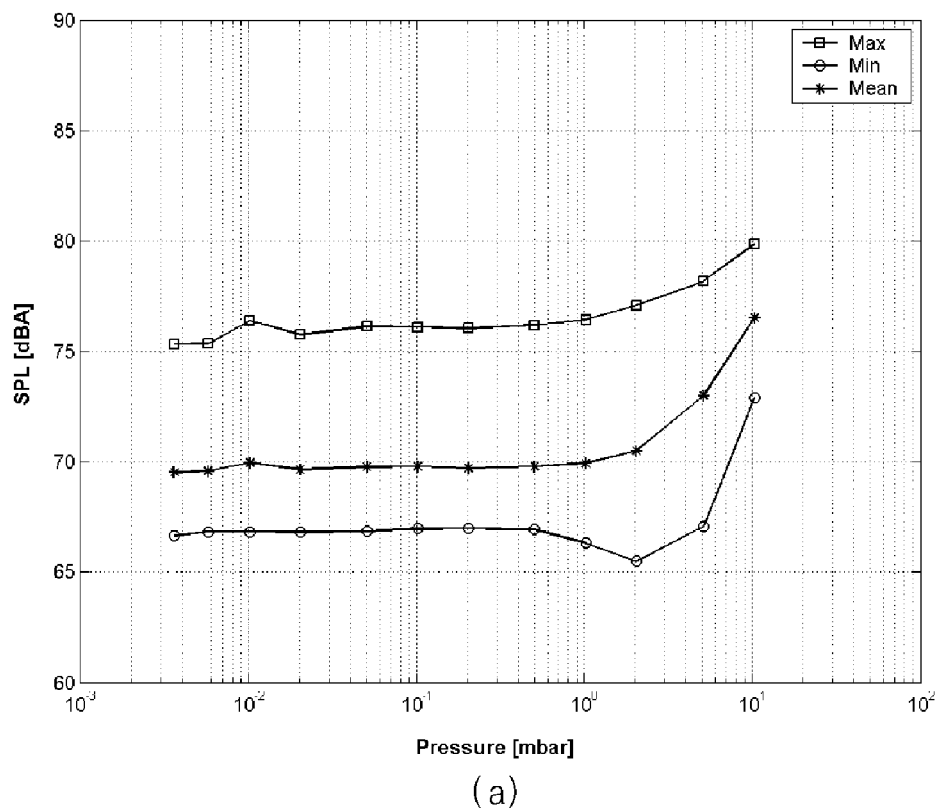
(a)
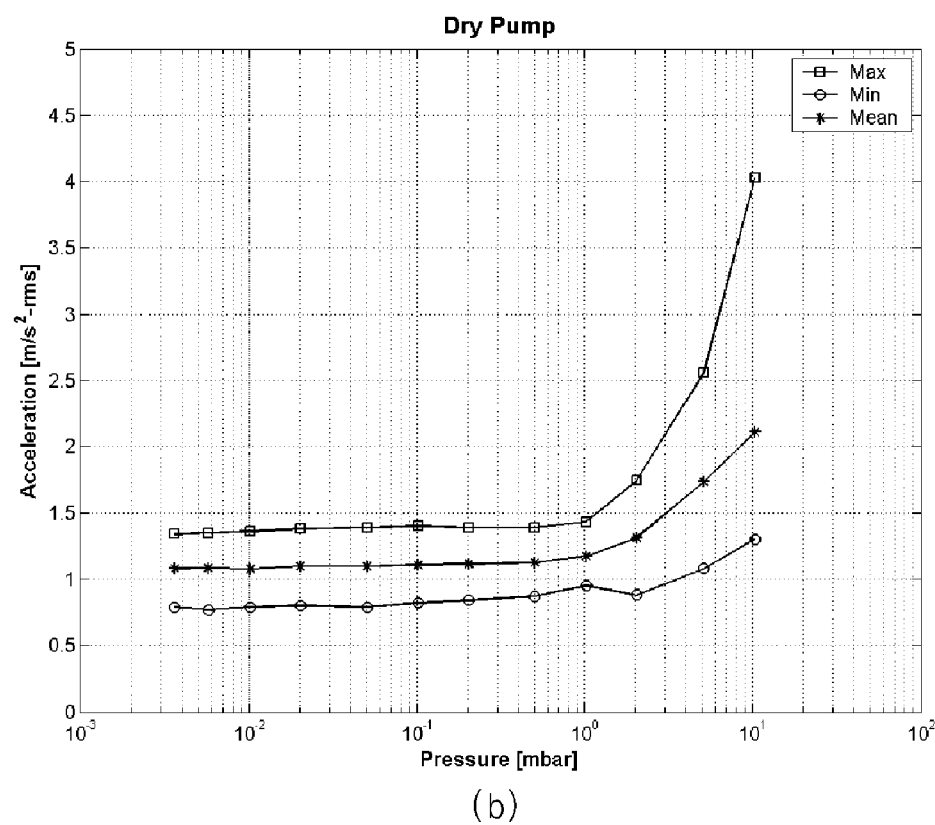
(b)

[Fig. 4]
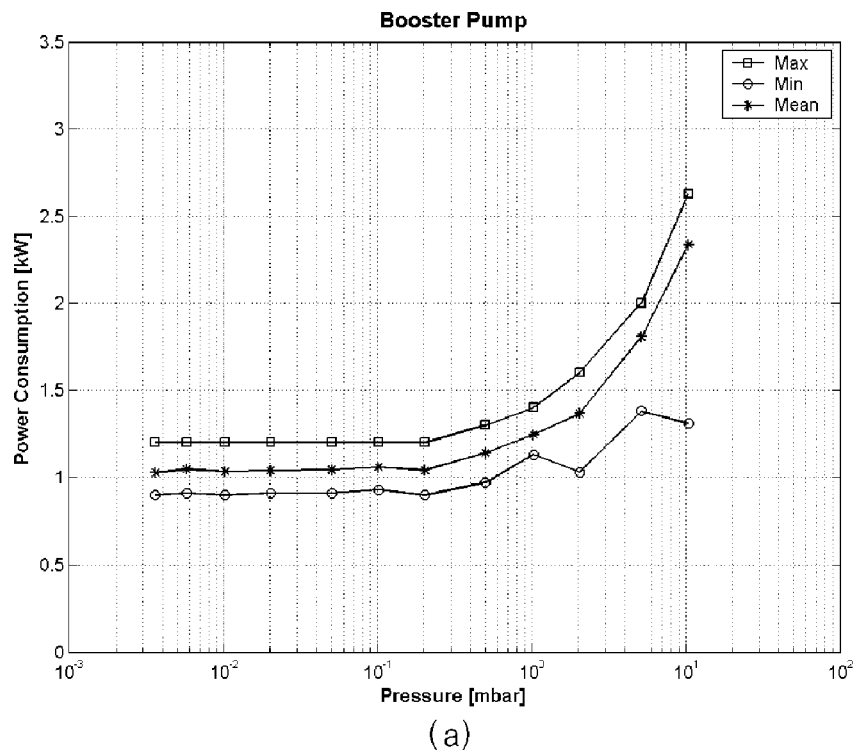
(a)
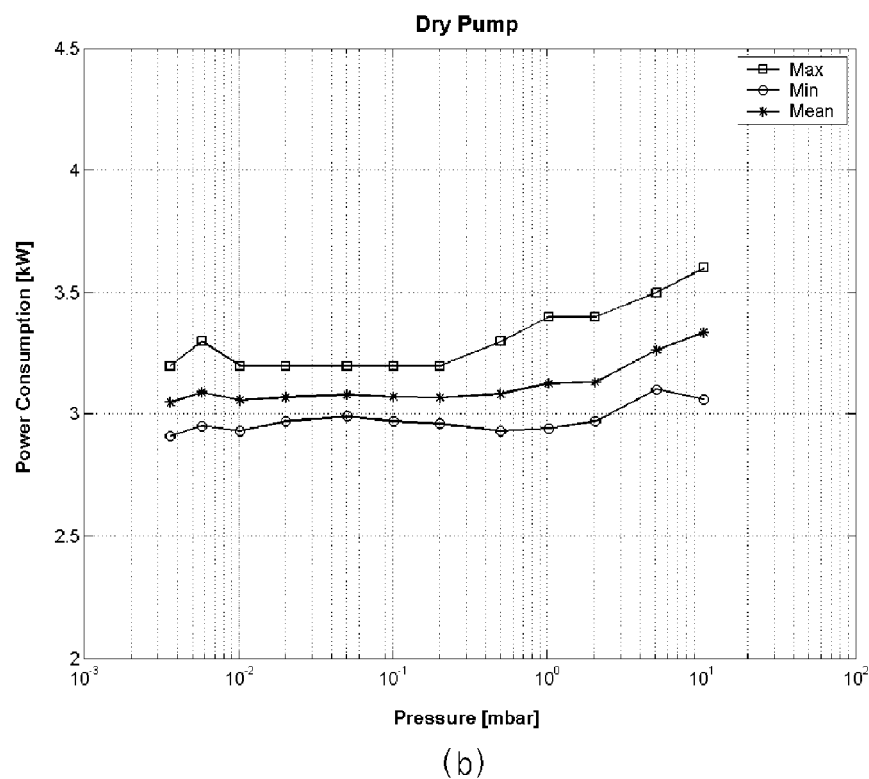
(b)

【Fig. 5a】
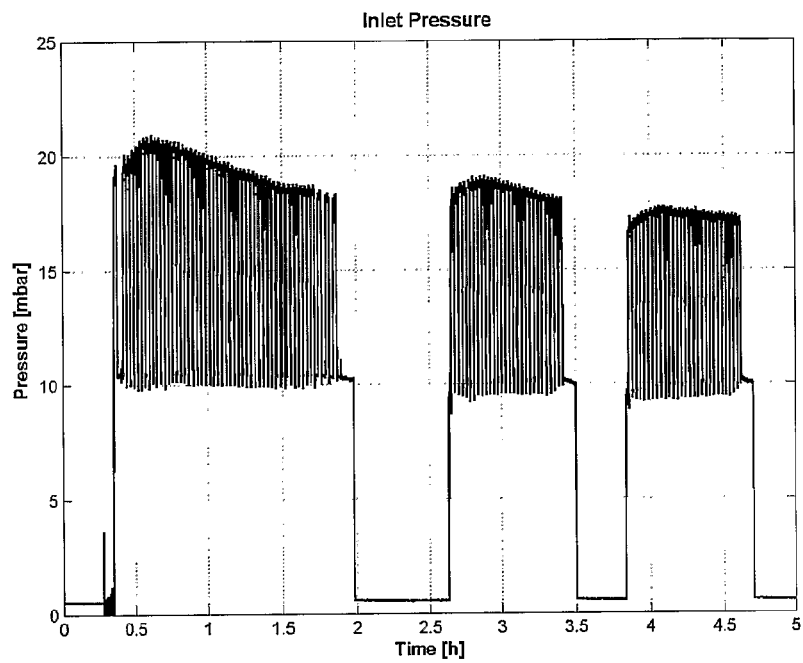
【Fig. 5b】
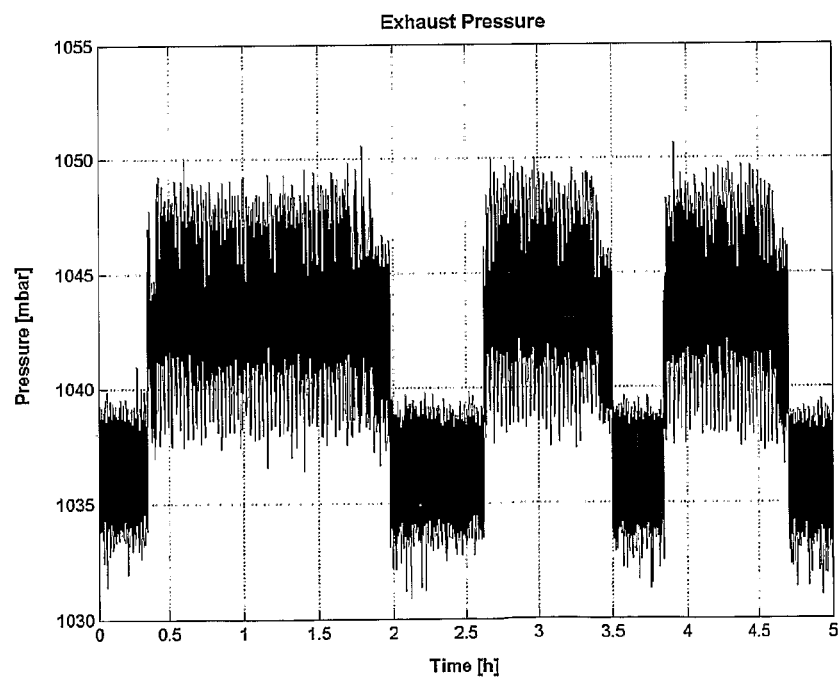

[Fig. 5c]
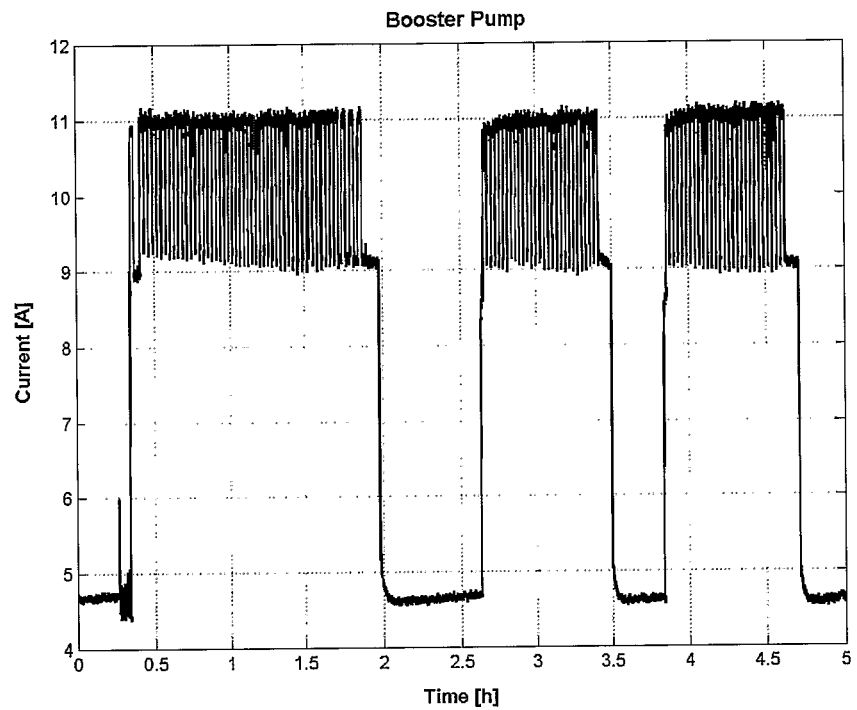
[Fig. 5d]
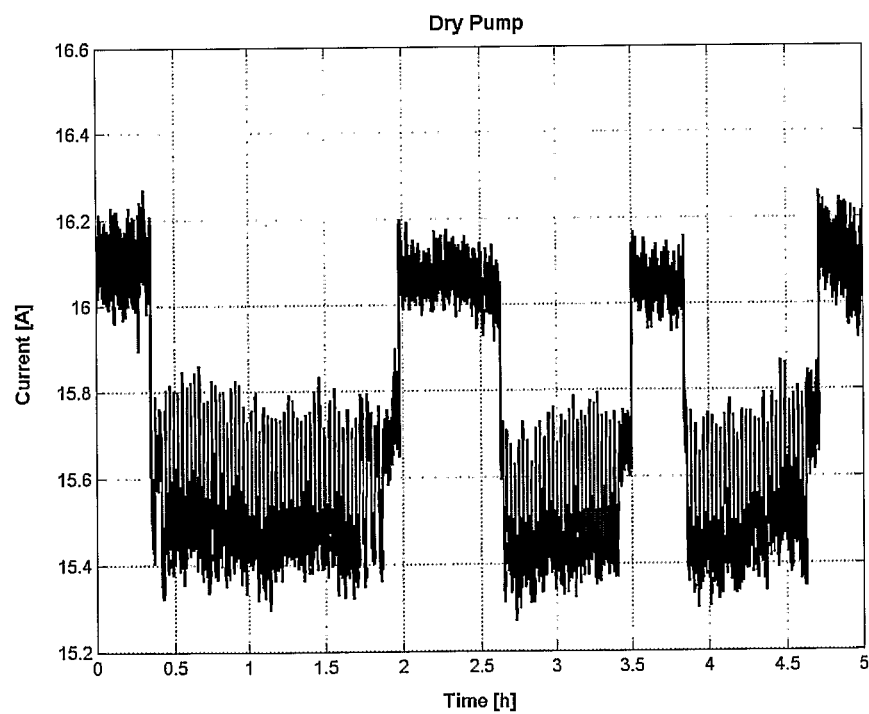

【Fig. 6a】
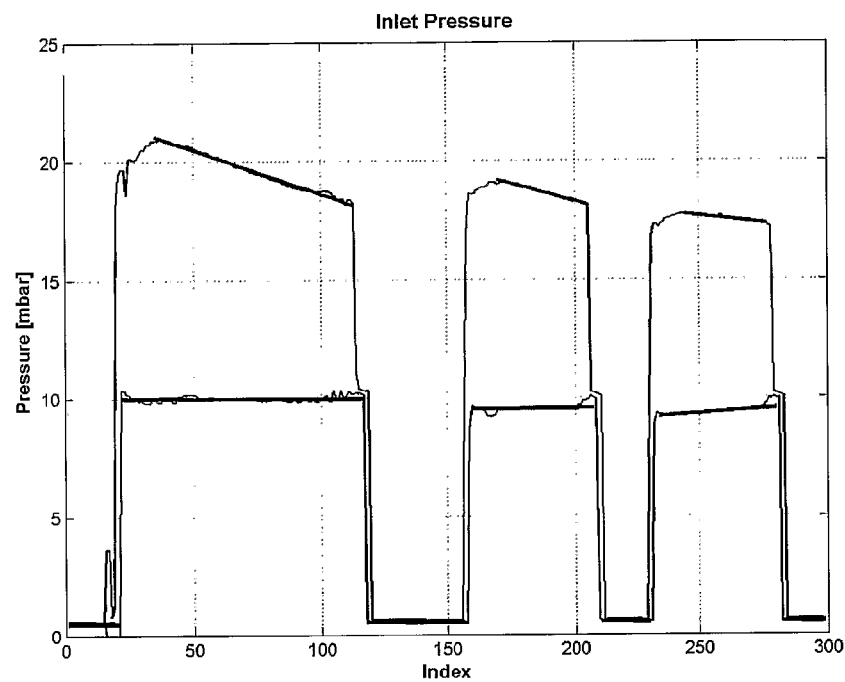
【Fig. 6b】
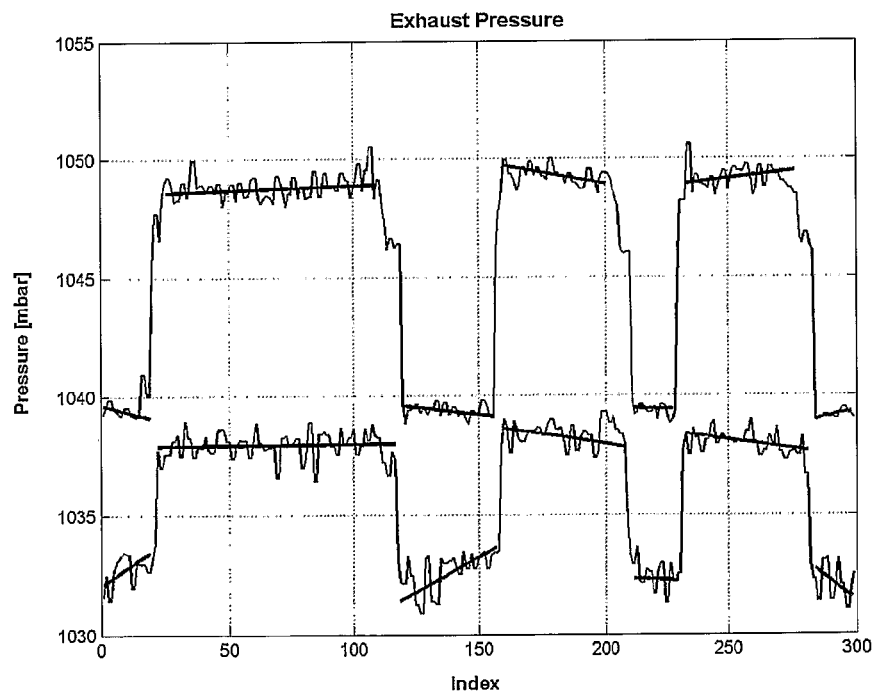

[Fig. 6c]
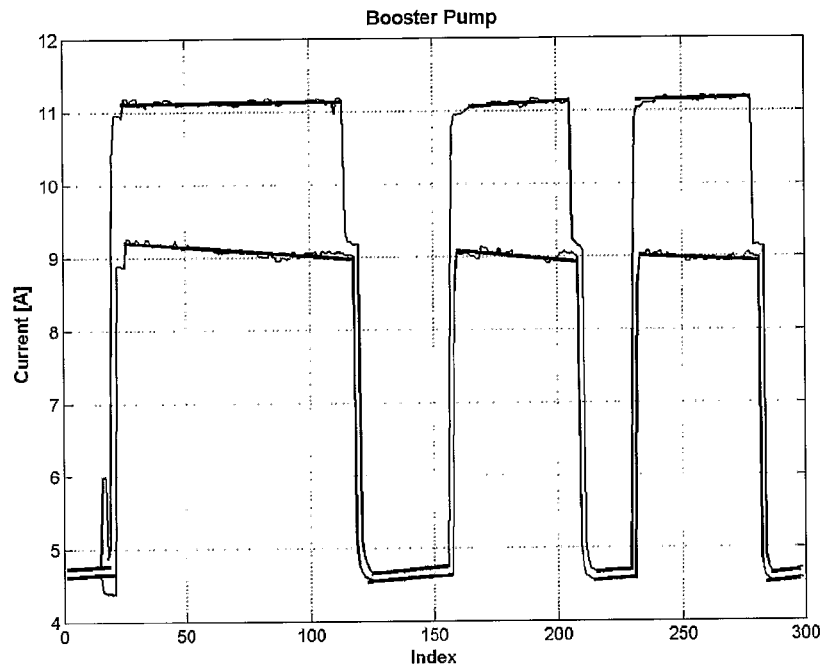
[Fig. 6d]
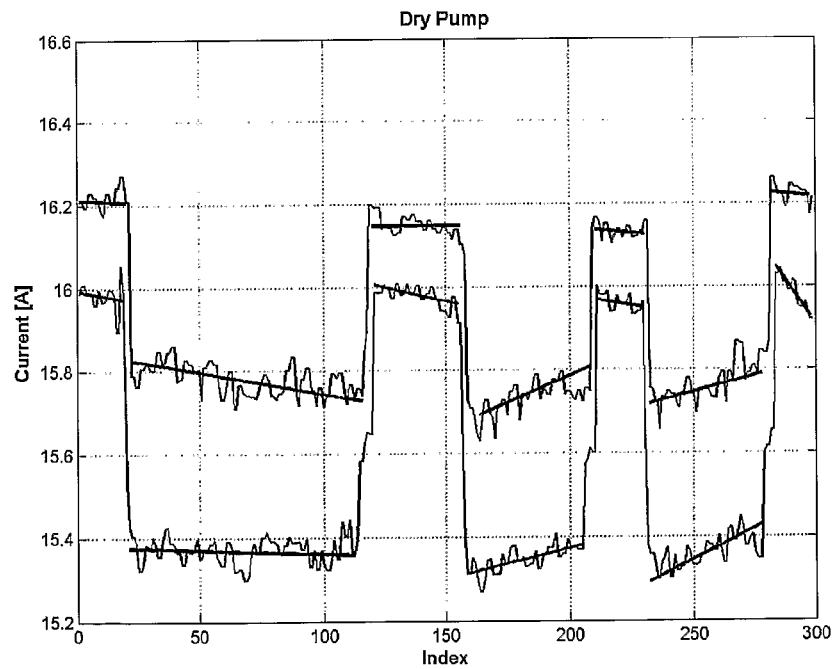

[Fig. 7a]
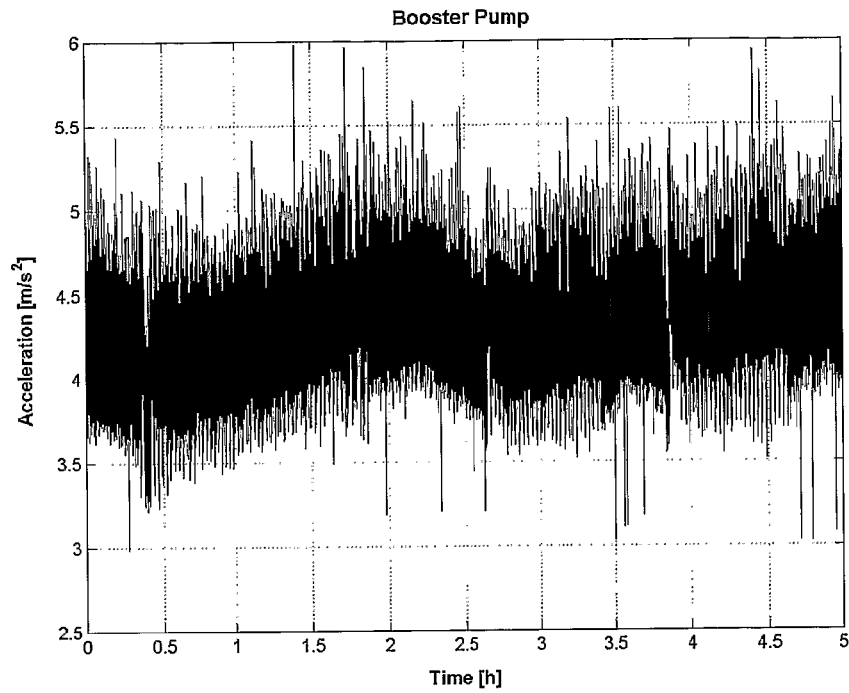
[Fig. 7b]
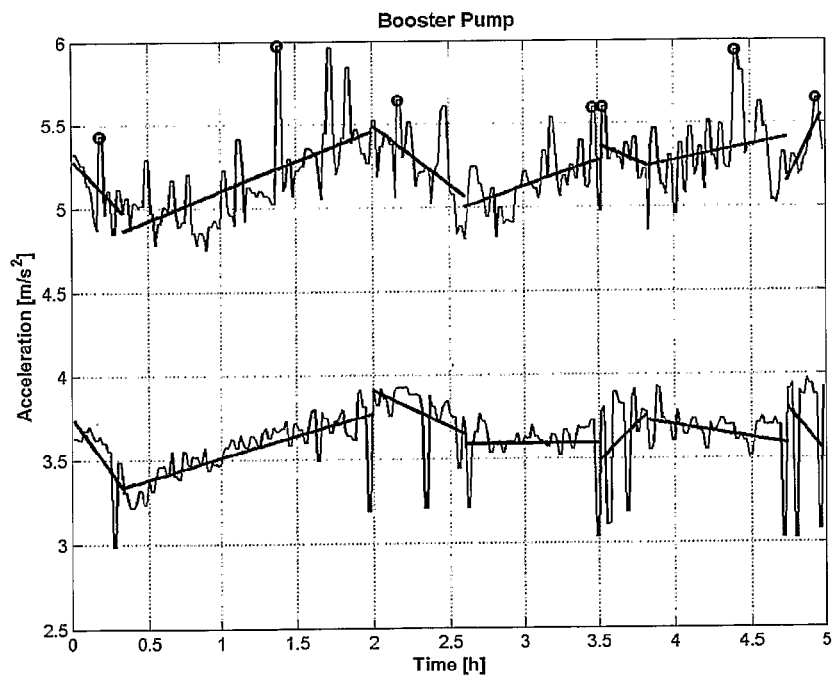

[Fig. 7c]
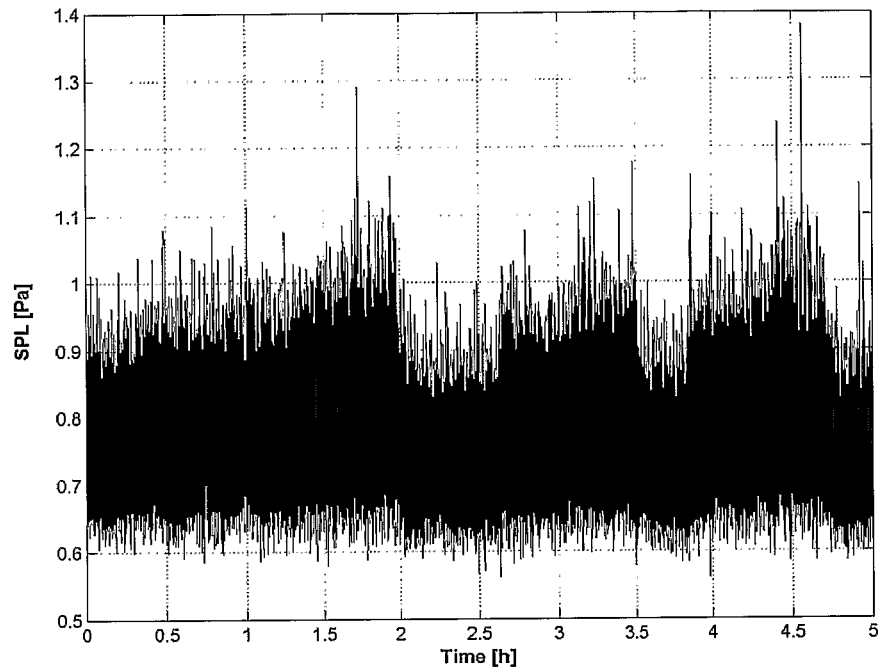
[Fig. 7d]
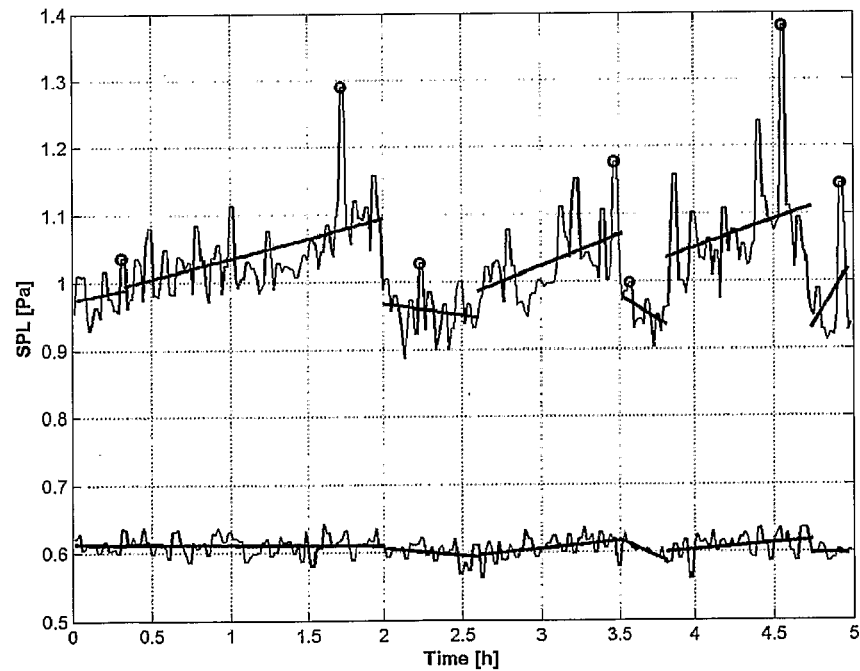

[Fig. 8]
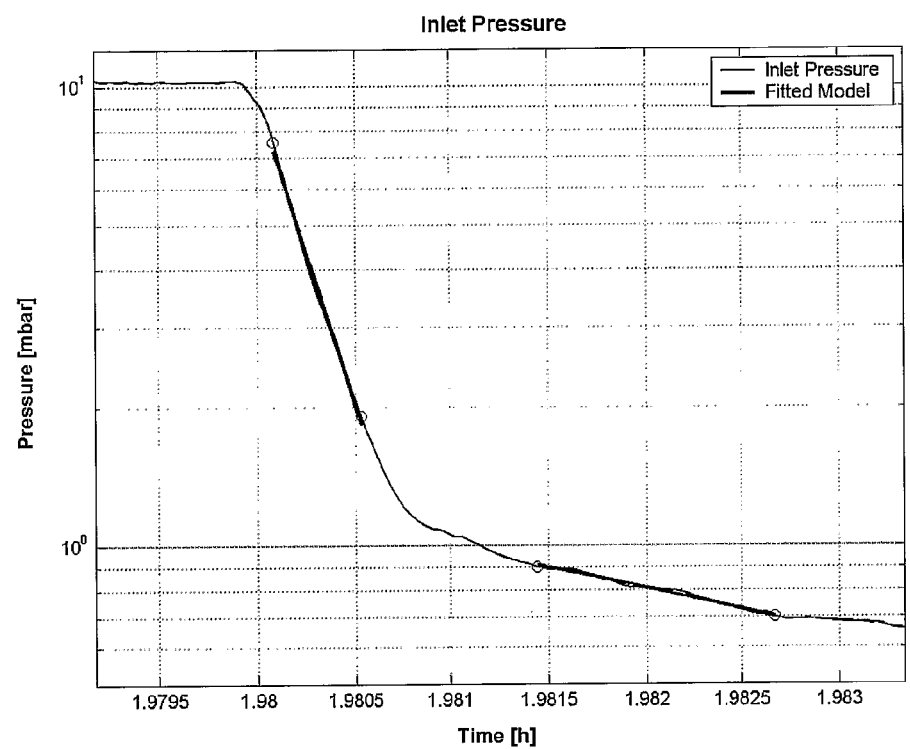

TREND MONITORING AND DIAGNOSTIC ANALYSIS METHOD AND SYSTEM FOR FAILURE PROTECTION AND FOR PREDICTIVE MAINTENANCE OF A VACUUM PUMP

This application claims priority under 35 USC 371 International Application No. PCT/KR2004/003329, filed on Dec. 17, 2004, is incorporated by reference in its entirety.

TECHNICAL FIELD

The present invention relates to the diagnostic method for the failure protection and maintenance of vacuum pumps, especially for semiconductor manufacturing processes having multiple operation conditions.

BACKGROUND ART

Demands on availability and reliability of vacuum pumps in modern semiconductor manufacturing processes have been constantly increasing. It is the reason that the costs for failed wafer batches and lost production times are higher and higher as the size of the production wafer is larger and larger. Technical demands on the vacuum pumps for such modern semiconductor processes have been well pointed out by Bahnen and Kuhn [Reference 1: R. Bahnen and M Kuhn, "Increased reliability of dry pumps due to process related adaptation and pre-failure warning," Vacuum, Vol. 44, No 5-7, pp. 709-712, 1993]: High reliability without unscheduled downtime, very low maintenance, high capability of pumping corrosive and reactive gas mixtures, high capability of pumping particles and sublimable gas mixtures, and low vibration and noise levels, etc. In order to satisfy those demands, a new dry pump for the modern semiconductor processes should provide the adaptation capability for the various process-dependent running conditions [Reference 1]. The adaptation to the different processes was shown to require the dedicated measurement and control of operation parameters such as temperatures and gas pressures inside the dry pump stages. Those process-related parameters are significant to check if the desired pump operation conditions are satisfied or not. In addition to the process-related parameters, the monitoring schemes of the pump operation-related ones (electrical power, cooling water, purge gas, wear of pump parts—bearings, seals, gear box, and motor) were also suggested by Bahnen and Kuhn [Reference 1] to avoid the risk of unscheduled downtime, in addition to the process adaptation of dry pumps. The warning and alarm level-based monitoring scheme for each operation parameter was suggested to avoid unexpected pump failures. But, any logical way of selecting all the warning and alarming levels of process-dependent and operation-related parameters are not proposed. Such threshold level selection is still a very challenging issue in the early detection of vacuum pump failure.

The threshold level-based monitoring has been widely recognized as a traditional technique for the failure protection of pumps [Reference 2: R. H. Greene and D. A. Casada, Detection of pump degradation, NUREG/CR-6089/ORNL-6765, Oak Ridge National Laboratory, 1995]. Wegerich et al [Reference 3: S. W. Wegerich, D. R. Bell and X. Xu, "Adaptive modeling of changed states in predictive condition monitoring," WO 02/057856 A2, 2002; Reference 4: S. W. Wegerich, A. Wolosewicz and R. M Pipke, "Diagnostic systems and methods for predictive condition monitoring," WO 02/086726 A1, 2002], however, pointed out the drawbacks of the senor output-based threshold warning and alarming schemes: "The traditional technique could not provide responses to gross changes in operational parameters of a process or machine, often failed to provide adequate warning to prevent unexpected shutdowns, equipment damage or catastrophic safety hazards." In order to overcome such limit of the traditional technique, they suggested the use of the neural network-based parametric model adaptive to new operational states [Reference 3] and the model-based diagnostic systems for predictive condition monitoring [Reference 4]. The neural network model, as known in the previous study [Reference 5: Wan-Sup Cheung, "Identification, stabilization and control of nonlinear systems using the neural network-based parametric nonlinear modelling," Ph.D. Thesis, University of Southampton, 1993] on the identification and control of dynamic systems, has the useful capability of interpolating a new state lying between trained data sets and extrapolating a neighboring state outside (but very near) the trained sets. Wegerich et al [Reference 3, Reference 4] exploited the interpolation and extrapolation capability of the trained neural network to estimate the current state of the process or machine in response to the measured values of sensor outputs. The estimated state values are subtracted from the actually measured sensor outputs to obtain the residual signals that are used to judge how the process or system deviates from the modeled state. Furthermore, these residuals are also used to generate the residual threshold alert, to perform the statistical test to check the shift of the process or system to a new operation condition, and to rebuild up a new training set for the shifted operation region. The suggested signal processing schemes of generating the alerts and adapting to the shifted operation region, including the construction of the new training set for the shifted operation region and their model learning process, are seen to require severe computation work and to accompany the inherent complexity of the suggested model-based diagnostic system. Such unrealistic computation load and implementation complexity of the suggested monitoring system has become unavoidable technical issues encountered in the pump monitoring systems for the modern semiconductor manufacturing processes. Consequently, a simple model adaptive to the pump operation conditions is significant in developing a pump monitoring system. This point has been one of main technical issues of this invention to be addressed later.

Instead of using the above parametric models adaptive to varying operation conditions of vacuum pumps with age, Ushiku et al [Reference 6: Y. Ushiku, T. Arikado, S. Samata, T. Nakao, and Y. Mikata, "Apparatus for predicting life of rotary machine, equipment using the same, method for predicting life and determining repair timing of the same," U.S. Patent Application Publication, US2003/0009311 A1, 2003], Samata et al [Reference 7: S. Samata, Y. Ushiku, K. Ishii, and T. Nakao, "Method for diagnosing life of manufacturing equipment using rotary machine," U.S. Patent Application Publication, US2003/0154052 A1, 2003; Reference 8: S. Samata, Y. Ushiku, T. Huruhata, T. Nakao, and K. Ishii, "Method for predicting life span of rotary machine used in manufacturing apparatus and life predicting system," U.S. Patent Application Publication, US2003/01543997 A1, 2003] and Ishii et al [Reference 9: K. Ishii, T. Nakao, Y. Ushiku, and S. Samata, "Method for avoiding irregular shutoff of production equipment and system for irregular shutoff," U.S. Patent Application Publication, US2003/0158705 A1, 2003] suggested the statistical analysis methods and the Mahalanobis distance-based analysis method to determine whether or not the currently measured time series data are deviated from the "reference" time series data set corresponding to the normal operation conditions. The statistical analysis methods are based on the second order statistical properties of sampled signals [Reference 10: J. S. Bendat A. G. Piersol, Random data: Analysis and measurement procedures, John Wiley & Sons: N.Y., 1985], such as the averaged values, standard deviations, and correlation functions. Because the use of the statistical properties makes sense only to the stationary processes, they have limited applicability to multiple load-dependent operation conditions required for the different products. It means that each reference time series data set corresponding to each load-dependent operation is required. A critical issue here is how to construct the data sets of load-dependent reference time series sufficient to cover the full range of normal operation conditions. Any effective way for constructing them is not yet proposed by Y. Ushiku et al [Reference 6], Samata et al [Reference 7, Reference 8] and Ishii et al [Reference 9]. To overcome the limited ability of detecting the abnormal running condition using the statistical analysis methods, they also considered the Mahalanobis distance analysis methods, as well known in the multi-variable statistics [Reference 11: W. H. Woodall, R. Koudelik, Z. G. Stoumbos, K. L. Tsui, S. B. Kim, C. P. Carvounis, "A review and analysis of the Mahalanobis-Taguchi system," TECHNOMETRICS, Vol. 45, No. 1, pp. 1-14, 2003], for the quantitative analysis of the similarity between the current time series data and the reference ones. When the reference time series data include the full range of normal operation conditions, those evaluation quantities seem to be more effective than the second order statistics (mean and variance) methods used for the traditional trend monitoring systems. But, the time series of normal operation conditions for new or reconditioned vacuum pumps are available only at the very beginning of each designated process such that the reference data with the full range of normal operation conditions could be not obtained without the time-consuming data acquisition and signal processing jobs. Any realistic way of constructing such reference data set is not well understood even in the modern semiconductor manufacturing community. In real, a modern semiconductor fabrication unit requires multiple processes with such different operation conditions as varying camber pressures, gas flow rates, and different gas mixtures and properties. Those process-related properties and operation conditions of semiconductor manufacturers are very confidential such that they are very often inaccessible to the vacuum pump suppliers. It is very significant to note that a vacuum pump monitoring and diagnosis system for the modern semiconductor processes should have the capacity of self-adapting to multiple process conditions. Developing an active way of recognizing different process conditions and diagnosing their operational states is essential for the drypump monitoring and diagnosis system for the modern semiconductor processes. This invention is shown to provide a realistic solution to such technical issues later.

DISCLOSURE OF INVENTION

Technical Problem

The inventors of this patent have already developed the accurate performance test and evaluation methods of low vacuum pumps and published their experimental results in several technical papers [Reference 12: J. Y. Lim, S. H. Jung, W. S. Cheung, K. H. Chung, Y. H. Shin, S. S. Ping, and W. G. Sim, "Expanded characteristics evaluation for low vacuum dry pumps," AVS 49th International Symposium, x-x, 2002; Reference 13: J. Y. Lim, W. S. Cheung, J. H. Joo, Y. O. Kim, W. G. Sim, and K. H. Chung, "Characteristics evaluation practice of predictable performance monitoring for low vacuum dry pumps," AVS 50th International Symposium, 9-10, 2003; Reference 14: W. S. Cheung, J. Y. Lim and K. H. Chung, "Experimental study on noise characteristics of dry pumps," Inter-noise 2002, Port Lauddale:USA, 2002; Reference 15: W. S. Cheung, J. Y. Lim and K. H. Chung, "Acoustical characteristics of dry pumps designed for semiconductor processes," Inter-noise 2003, Jeju, Korea, 2003]. Those experiments were carried out on the low vacuum pump test bench whose schematic drawing is shown in FIG. 1.

The test bench has been used to evaluate the performance factors of low vacuum pumps, such as the pumping speed the ultimate pressure, the electrical power consumption, the gas load simulation, the residual gas analysis, and the acoustical noise and mechanical vibration levels, etc. More than one hundreds of vacuum pumps supplied to the semiconductor manufacturers have been tested so far. Their test results have provided the inventors with the systematic understanding about the key performance factors and dynamic characteristics of various vacuum pumps.

FIG. 2 illustrates the statistical features (maximum, minimum and mean values) of the pumping speed measured from the multiple pumps of the identical model. The square-marked asterisk-marked and circle-marked lines denote the maximum, minimum and averaged pumping speed among the test results, which were obtained from the different gas load conditions simulated by controlling the internal gas pressure of the test dome shown in FIG. 1. The coefficient of variability for the pumping speed which is defined by the ratio of the mean value to the standard deviation, was observed to be 6.7% at the internal pressure of test dome equal to 0.01 [mbar] and 5.0% at the pressure of 0.02 [mbar], respectively. Over the higher level than 0.05 [mbar], the coefficients of variability were seen to be equal to or less than 3.5%. It means that the pumping speed for the tested vacuum pumps is quite well quality-controlled within the small variability. It is important to see that the pumping speed with the small variability is a good indicator to judge whether the current running state of the pump is normal or not. In real, the pumping speed is the most significant factor among the performance parameters of the low vacuum pump. But, the previous inventions for monitoring the operation conditions of vacuum pumps do, not consider the pumping speed as the monitored state variable.

In the next section, this invention will show a systematic way of monitoring the pumping speed of the site-installed pumps. FIG. 3 shows what amount of variations of the acoustical noise and mechanical vibration levels exist among the tested pumps. Although their pumping speed has the small variability shown in FIG. 2, the acoustical noise and mechanical vibration levels are shown to be very different for each pump of the identical model. The acoustic noise level was estimated by averaging the measured sound pressures from the ten selected positions recommended by the ISO 3744 standard The maximum difference in the acoustic noise level was observed to be 12 dBA at the test dome pressure of 2 [mbar]. At the other gas load conditions, the sound pressure level (SPL) difference was close to about 9 dBA. Such large SPL difference is equivalent to four times loudness difference (double loudness per 5 dBA SPL difference). The coefficient of variability for the sound pressure levels was found to be 51%~65% over the pressure range of 0.01 [mbar] to 10 [mbar]. The coefficient of variability for the mechanical vibration (acceleration) levels was found to be 19%~23% below the pressure of 1 mbar and to increase to 51% as the gas pressure reaches to 10 [mbar]. Moreover, the ratio of the minimum to maximum levels for the mechanical acceleration levels were observed to be 1.4 to 1.6 below the gas pressure of 1 [mbar] but to increase rapidly to 3.3 as the gas pressure reaches to 10 [mbar]. Such large variability indicates that each individual pump has its own normal operation conditions for the acoustical noise and mechanical vibration. This pump-by-pump dependent operation characteristics has yielded much difficulty in using the fixed level-based threshold methods for generating the warning or alarm signals for the machinery operation monitoring systems because they have often led to unreliable and inconsistent state monitoring results, i.e. false warning or alarm signals even for the normally running machinery. In order to improve such limited capability of the fixed level-based machine state monitoring and diagnosis systems, this invention will suggest an active algorithm in Section 3 that is self-adaptive to the pump-by-pump dependent normal operation conditions.

It should be noted that such large variability for the state variables of the machine operation monitoring systems is not limited to the acoustical noise and mechanical vibration signals. FIG. 4 shows the statistical characteristics (maximum, minimum and mean values) of the electrical power consumption values measured from the booster pump and the dry pump. The ratio between the minimum and maximum power consumption values for the booster pump was observed to be 1.3 below the gas pressure of 2 [mbar] and to increase to 1.6 as the gas pressure reaches to 10 [mbar]. The coefficient of variability for the booster pump was seen to be 9%~11% below the gas pressure of 1 [mbar] but to increase steeply to 57% as the gas pressure reaches to 10 [mbar]. Unlike this large variability of the electrical power consumption for the booster pump, the ratio between the minimum and maximum power consumption values for the dry pump was observed to be 1.1~1.2 over the tested gas pressure range. The coefficient of variability was also seen to be 4%~6% over the tested gas pressure range. Those test results indicate that the total power consumption of the booster and dry pumps is a state variable with large variability such that the total power consumption value is ineffective for the state monitoring system. As a result, the two separated power consumption values for the booster and dry pumps are considered in the invention.

It is very important to understand what amount of measured state variables increases as the gas load conditions vary over the pump operation range. Experimental results shown in FIGS. 3 and 4 help to find the answer to the question by observing carefully the mean values (denoted by the asterisk-marked solid lines). Although the test dome gas pressure gradually increases to some extent, the mean values remain even. It is a region where the measured state variables of the acoustical noise, mechanical vibration, and electrical power consumption levels are independent of the gas load. This invention does also exploit such gas load-independent characteristics for the measured state variables to diagnose the vacuum pump operation conditions. Such gas load-independent conditions are very often found in the real process conditions. A good example is an "idle" state for the running vacuum pump, which is the interval any external gas is not supplied to the pump inlet port. This invention in the next section will propose a systematic way of modeling the load-independent behaviors of the state variables for the vacuum pump monitoring and diagnostic system. Furthermore, as the gas pressure increases above the gas load-independent region, the mean values of the acoustical noise, mechanical vibration, and electrical power consumption variables are shown to increase. For instance, the maximum acoustical noise level in the gas-load dependent region is shown to be 12 dBA (four times) higher than that in the gas load-independent one. Similarly, the maximum mechanical vibration level in the gas-load dependent region is shown to be 2.4 times higher and the electrical power consumption levels of the booster and dry pumps also to be 2.3 and 1.2 times larger, respectively. Here, another technical issue encountered form the state monitoring and diagnostic systems is to find an adequate model for describing those gas load-dependent behaviors of the state variables since the real operation range of the vacuum pumps always include the gas load-dependent conditions. In the next section, this work will also propose a systematic way of modeling the dynamic characteristics of the state variables in the gas load-dependent region. Of course, a mathematically identical model is shown to be applicable to both gas load independent and dependent conditions. As a result, one model is dedicated for the gas load-independent running region and the other for the gas load-dependent one. The use of two separated models has been developed to improve the reliability and confidence for detecting possible abnormal running conditions of the vacuum pumps as early as possible.

It is obvious in this work that monitored information about the gas load conditions, i.e. the inlet gas pressure signals of the vacuum pump, should play an important role in distinguishing the abnormal running conditions of the vacuum pumps, more specifically judging whether the increase of monitored state variables are caused by the gas load or not. In order to improve the capability of diagnosing the abnormal running conditions of the vacuum pumps more reliably, the use of the monitored inlet gas pressure information has not been made in the previous inventions. In this work, the monitoring of the inlet gas pressure is shown to enable the quantitative analysis of the pumping speed in action to the improvement of the diagnosis capability. This point is invaluable since the evaluated pumping speed leads to the determination of the suitable time when the vacuum pump of interest should be replaced by a new one. This invention presents a logical way of assessing the pumping speed of the running vacuum pump in the semiconductor fabrication site.

Technical Solution

According to the present invention, there is provided a trend monitoring and diagnostic analysis method for the failure protection and predictive maintenance of a vacuum pump running under idle and gas-loaded operation conditions alternately, comprising the steps of: sampling the time series of the state variables signals at the predetermined rate for the idle and gas-loaded operation conditions; sorting out the maximum and minimum values of the time series of the state variables from each segmented set of consecutively sampled signals being longer than the period of fluctuating state variable signal components for the idle and gas-loaded operation conditions; estimating the one set of the best-fitted model parameters of the asymptotic upper bound from the sorted maximum values of each state variable and the other set of the best-fitted model parameters of the asymptotic lower bound from the sorted minimum values of each state variable, by using a linear parametric model-based active diagnostic algorithm, for the idle and gas-loaded operation conditions; evaluating the pumping speed indicator based on a inlet pressure signal by using the in-situ estimation method whenever the transition state from the gas-loaded operation condition to the idle one is observed; storing the estimated upper and lower model parameters of the asymptotic upper and lower bounds of all considered state variables for each idle and gas-loaded operation condition and the evaluated pumping speed indicator whenever the transition state from the gas-loaded operation condition to the idle one is observed; repeating the estimation of model parameters of the upper and lower bounds of each state variable for the idle and gas-loaded operation conditions and the evaluation of the pumping speed indicator; and monitoring the variation trend from the estimated upper and lower model parameters of all considered state variables collected for the consecutive idle operation conditions and from those of all considered state variables collected for the consecutive gas-loaded operation conditions and from the consecutively collected pumping speed indicators from the repeated transitions from the gas-loaded operation state to the idle state, and diagnosing whether the vacuum pump is abnormal or not on the basis of the variation trend analysis results thereof.

According to the present invention, there is also provided a trend monitoring and diagnostic analysis system for the failure protection and predictive maintenance of vacuum pumps running under the multiple processes including idle and gas-loaded operation conditions alternately, comprising: data acquisition unit for sampling the time series of the state variables signals at the predetermined rate for the idle and gas-loaded stages in a real-time; and signal processing unit provided with calculation and storage means for the measured signals from the data acquisition unit, and said signal processing unit being characterized in that it provides the steps of: sorting out the maximum and minimum values of the time series of the state variables from each segmented set of consecutively sampled signals being longer than the period of fluctuating state variable signal components for the idle and gas-loaded operation conditions; estimating the one set of the best-fitted model parameters of the asymptotic upper bound from the sorted maximum values of each state variable and the other set of the best-fitted model parameters of the asymptotic lower bound from the sorted minimum values of each state variable for each idle and gas-loaded operation condition; evaluating the pumping speed indicator based on a inlet pressure signal by using the in-situ estimation method whenever the transition state from the gas-loaded operation condition to the idle one is observed; storing the estimated upper and lower model parameters of the asymptotic upper and lower bounds for each state variable and the evaluated pumping speed indicator; monitoring the variation trend from the estimated upper and lower model parameters of all considered state variables collected for the consecutive idle operation conditions and from those of all considered state variables collected for the consecutive gas-loaded operation conditions and from the consecutively collected pumping speed indicators from the repeated transitions from the gas-loaded operation state to the idle state, and diagnosing whether the vacuum pump is abnormal or not on the basis of the variation trend analysis results thereof.

According to the present invention, there is also provided a computer-readable storage media including a computer program which performs the above-described diagnostic method for the failure protection and predictive maintenance of vacuum pump running under the idle and gas-loaded operation conditions alternately.

Advantageous Effects

The most challenging issues in this work have been to find simple and effective ways to deal with technical problems arising from the large variability of the pump-by-pump operation characteristics and the multiple process conditions.

This work proposes the two separated model parameter sets, i.e. the one estimated under the idle operation condition of the vacuum pump and the other estimated under the gas-loaded operation condition. The reason is it that the measured signals of the state variables under the two operation conditions have quite different statistical characteristics and that the separated trend monitoring and diagnostic analysis for the idle and gas-loaded operation conditions is chosen to realize much improved performance for the early detection of vacuum pump failure.

Of course, this work presents effective ways of separating the idle and gas-loaded operation conditions using such measured state variables as the inlet pressure, the supply current of the booster pump, and the exhaust pressure.

Further, this work introduces the in-situ algorithm of evaluating the pumping speed using the measured inlet pressure signals and the proposed pumping speed evaluation algorithm makes it realizable to examine what extent of the current pumping speed is degraded in comparison to the initial value. The knowledge about the extent of such pump speed degradation is invaluable because it enables pump maintenance engineers to judge when the considered vacuum pump should be replaced by the new one.

Moreover, this work presents a logical way of constructing the series of the best-fitted model parameters corresponding to the seven state variables and the pumping speed indicators into the matrix-typed data suitable for the multi-variable statistics analysis, the capacity analysis and the Mahalanobis distance analysis. The transplantation of the model parameter structured data matrixes to such conventional analysis algorithms (the multi-variable statistical analysis, the process capability analysis, and the Mahalanobis distance analysis) is surely one of the main achievements contributed by this work.

BRIEF DESCRIPTION OF THE DRAWINGS

FIG. 1 is a schematic drawing of the performance test bench of low vacuum pumps of the present invention;

FIG. 2 shows a statistical characteristics for the pumping speed of low vacuum pumps;

FIGS. 3A and 3B show spatially averaged acoustic noise levels characteristics of low vacuum pumps and mechanical vibration levels characteristics of low vacuum pumps, respectively;

FIGS. 4A and 4B show characteristics of electrical power consumption of booster pumps and characteristics of electrical power consumption of dry pumps;

FIGS. 5A to 5D show measured state variable signals, the inlet and exhaust pressures and the supply currents of the booster and dry pumps, respectively;

FIGS. 6A to 6D show comparison of the sorted maximum and minimum values (thin solid lines) and the fitted model-based estimation results (thick solid lines) for the inlet and exhaust pressure signals and the current signals of the booster and dry pumps, respectively;

FIGS. 7A to 7D show root-mean-squared (rms) values of the vibration acceleration and acoustical noise signals and their asymptotic upper and lower bound curves (thick solid-lines), respectively;

FIG. 8 shows inlet pressure signal of the first negative going transition region existing between the first gas-loaded operation region and the second idle region (The thick solid line indicates the fitted model of the exponentially decaying function).

BEST MODE FOR CARRYING OUT THE INVENTION

Active Diagnostic Algorithms of Vacuum Pumps

A state variable in this invention is defined as one of periodically sampled physical parameters selected to examine quantitatively the operation conditions of a considered vacuum pump. There are various pump operation-related state variables such as the motor currents, the inlet and exhaust pressures, the sound pressure signals, the mechanical vibration signals, the purge gas pressure and its flow rate, the body temperatures, the cooling water temperature, the lubrication oil pressure and level of the vacuum pump, etc. Those vacuum pump state variables have been used to diagnose the vacuum pump running conditions. But, a limited number of state variables have been selected to realize the effective diagnosis of the vacuum pumps. Their selection in this invention has been made according to the gas load dependency. If the response of a state variable to the inlet gas pressure of the vacuum pump is highly dependent, it is classified to be the "real-time" monitoring variable sampled at each short period (i.e. 10 samples per second). As the real-time monitoring variables, the inlet and exhaust pressures, the supply currents of the booster and dry pumps, the mechanical vibration and acoustic noise signals are considered in this work. On the other hand if its response dependency is relatively low, it is classified to be the "auxiliary" state variable sampled at the low speed (i.e. one sample per second). As the auxiliary state variables, the purge gas pressure and its flow rate, the body temperatures, the cooling water temperature, the lubrication oil pressure and level of the vacuum pump are classified in this work. This work does not consider these auxiliary state variables since the conventional second-order statistical methods are sufficient to implement successfully their trend monitoring and diagnostics. The reason is it that they well satisfy the statistical stationary conditions. The future work may investigate the effectiveness of the proposed active diagnostic algorithms to the state monitoring and diagnostic analysis of the auxiliary state variables listed above.

The active algorithm, as well known in the digital signal processing and control theory [Reference 16: B. Widrow and S. D. Steams, Adaptive Signal Processing, Prantice-Hall, Englewood Cliffs: N.J., 1985; Reference 17: P. A. Nelson and S. J. Elliott, Active Control of Sound, Academic Press, London, England, 1992], has provided an effective tool for adjusting the parameters of a considered system model that is chosen to describe the dynamic characteristics imbedded in the measured state variables. The active algorithm enables the estimation of the model parameters well adjusted to the dynamically varying state variables. The estimated model parameters are exploited to diagnose the vacuum pump running conditions. This theoretical approach is referred to the "active diagnostic" algorithm in this invention. It is significant to note that the active algorithm provides the set of the model parameters tuned to the different pump operation characteristics, i.e. multiple process conditions. Of course, it still enables the estimation of the model parameters even for the different pumps. A set of these pump dependent parameters is extremely useful to examine the operation variability for a group of same model vacuum pumps. It is the reason to use the parametric model-based active algorithm for the diagnosis of the vacuum pumps.

1. Active Algorithm for Parametric Modeling of Diagnostic State Variables

The choice of a parametric model in this work was made from the observation of the signal characteristics of measured state variables. FIG. 5 shows the measured signals of (a) the inlet pressure, (b) the exhaust pressure, (c) the supply currents of the booster pump and (d) the supply currents of the dry pump, respectively, which were sampled at the rate of 10 words per second.

As shown in FIG. 5(a), two distinctive amplitude regions, i.e. a group of 'fluctuating amplitude-leveled' regions and a group of 'even amplitude-leveled' ones, are obviously observed from the inlet pressure signals. The even amplitude-leveled zones correspond to the "idle" operation state of the vacuum pump to which any pumping gas is not supplied externally from the process chamber.

The fluctuating amplitude-leveled regions correspond to the pumping operation state whose gas load conditions are varied between the upper and lower asymptotic curves as shown in FIG. 5(a). Let ym denote the m-th sampled inlet pressure signal and the subscript m denote the time index. In this work, the sampling rate was chosen to be 10 Hz (10 samples per second). The sampled time series {ym: m=1, 2, ... } of the inlet pressure are used to sort out the minimum and maximum values over the user selected period, i.e. each 30 second or each minute, which was selected to be longer than the period of fluctuating inlet pressure signals under the gas loaded operation conditions. Once the longest period of fluctuating pressure signals was 54 seconds, each sorting of the maximum and minimum values was carried out each minute.

FIG. 6 illustrates the comparison of the sorted maximum and minimum values (thin solid lines) and the fitted model-based estimation results (thick solid lines) for (a) the inlet pressure signals, (b) the exhaust pressure signals, (c) the current signals of the booster pumps and (d) the current signals of the dry pumps.

FIG. 6(a) shows the sorted maximum and minimum values of the inlet pressure signals. Let the maximum and minimum values be $\{y_U, n, y_L, n:n=1, 2, \ldots \}$ obtained from each set of consecutively sampled 600 signals (equivalent to the record signals for one minute). This invention suggests the use of a linear model for describing the upper and lower asymptotic curves, which is given as $$y_{k,n} = a_k \cdot n + b_k \qquad \text{Math Figure 1}$$

In equation (1), the subscript k denotes the upper or lower asymptotic models, i.e. k=U for the upper asymptotic model and k=L for the lower asymptotic model. In equation (1), the two sets of model parameters $\{a_k, b_k: k=U \text{ or } L\}$ are readily obtained by using the least squares method. Let the time series of the maximum and minimum values sorted for each pumping state be $\{y_{k,n}:n=1, 2, \ldots, N\}$. The best-fitted model parameters are obtained as follows:

$$a_k = \frac{N \cdot \sum_{n=1}^{N} N \cdot y_{k,n} - \sum_{n=1}^{N} n \cdot \sum_{n=1}^{N} y_{k,n}}{N \cdot \sum_{n=1}^{N} n^2 - \left(\sum_{n=1}^{N} n\right)^2},$$

$$b_k = \frac{\sum_{n=1}^{N} n^2 \cdot \sum_{n=1}^{N} y_{k,n} - \sum_{n=1}^{N} n \cdot \sum_{n=1}^{N} n \cdot y_{k,n}}{N \cdot \sum_{n=1}^{N} n^2 - \left(\sum_{n=1}^{N} n\right)^2}$$

MathFIG. 2

The first parameters $\{a_k: k=U \text{ or } L\}$ in equation (2) are the slop of the inlet pressure signal that indicates the increasing or decreasing rate as the measurement time goes. The second parameters $\{b_k: k=U \text{ or } L\}$ indicate each initial inlet pressure levels (i.e. at n=0). The thick solid lines FIG. 6(a) illustrate the estimated results using the fitted models for the upper and lower asymptotic curves. Both upper and lower asymptotic curves for the gas loaded conditions are shown to be well fitted Furthermore, both parameters can be usefully used to examine what amount of the inlet gas pressure variation exists for each gas loaded process conditions. It indicates the fact that the trend of the inlet gas pressure fluctuation features for each process stage can be quantitatively characterized by the model parameters. This point is invaluable since only the two sets of fitted model parameters enables the trend monitoring and diagnosis for the current inlet pressure. The use of the fitted model parameters provided much memory saving for the trend monitoring and diagnosis system since the proposed approach does not use a full set of sampled time series for each process stage. It means that a compact hardware based implementation system is realizable by using the fitted model parameters. It should be noted that the mean value and the standard deviation for each upper or lower asymptotic curve are also obtained by using the following equation.

$$y_{k,mean} = \frac{N+1}{2} \cdot a_k + b_k,$$ MathFIG. 3

$$\sigma_k = a_k \cdot \sqrt{\frac{1}{N} \cdot \sum_{n=1}^{N} (y_{k,n} - a_k \cdot n - b_k)^2} \text{ for } a \neq 0$$

$$y_{k,mean} = b_k, \sigma_k = \sqrt{\frac{1}{N} \cdot \sum_{n=1}^{N} (y_{k,n} - b_k)^2} \text{ for } a = 0$$

In case of zero valued slop (a=0 in equation (3)), the second parameter is shown to be the mean value.

It is shown in equation (3) that the estimated parameters enable the calculation of the statistical properties (the mean and standard deviation values) and the analysis of the increasing or decreasing rate of the measured inlet pressure. It reveals the usefulness of using the parametric model that is adjustable to the statistical characteristics of measured state variables. The statistical information about the inlet gas pressure signals is very useful to examine the current gas loaded conditions of the running vacuum pumps. The active algorithm of modeling the dynamic operation characteristics observed from the gas loaded operation conditions have been considered so far. As shown in FIG. 5(a), the magnitude of the inlet pressure in the even-amplitude regions looks flat but a small amount of fluctuation is seen to exist when the scale of the even amplitude-level zones is zoomed out. The two parametric models corresponding to the upper and lower asymptotic bounds are also considered even for the idle states. The same active algorithm as implemented for the gas loaded pumping conditions is also exploited to estimate the model parameters of the upper and lower asymptotic curves for the idle states. Given the time series of the sorted maximum and minimum values of the sampled inlet pressure signals under the idle states, the two sets of the upper and lower model parameters are obtained from equation (2). The mean value and the standard deviation for each asymptotic curve are also obtained from the equation (3). Those fitted model parameters and their statistical properties estimated in the idle operation regions, in action to those estimated under the gas loaded operation conditions, are also exploited for the trend monitoring and diagnosis of the vacuum pumps. The combined parameter sets of the idle and gas-loaded operation conditions are very useful to examine not only what amount of gas load conditions is exerted upon the running vacuum pumps but also what extent of vacuum level in the idle states is maintained. The knowledge of the gas loading conditions to the vacuum pumps will be shown to play a critical role in distinguishing the possible causes of observed abnormal pump operations, i.e. to check whether extraordinary pump operations are caused by the abnormal gas load conditions or other mechanical faults. If such pump operations are caused by some abnormal gas load conditions, they are not the case of vacuum pump faults. Therefore, the knowledge of the gas load conditions of running vacuum pumps is so important for the accurate and reliable diagnosis. This work puts much emphasis on the use of the inlet pressure signal for the precision diagnosis of vacuum pumps specifically used in the semiconductor fabrication processes.

The theoretical background of the parametric model, selected to describe the dynamic behaviors of the inlet pressure signals observed from the vacuum pumps, has been addressed so far. That approach is also applicable to other state variables such as the exhaust pressure signals and the supply current signals of the booster and dry pumps shown in FIGS. 5(b) to (d). The time series of the maximum and minimum values for each state variable are readily obtained by sorting out the maximum and minimum values from every block of consecutive 600 samples (equivalent to the recorded signals for one minute) supplied from the data acquisition system. FIG. 6(b) to (d) illustrates the time series of the sorted maximum and minimum values (the thin solid lines) and fitted model-based estimation results (the thick solid lines) for the exhaust pressure signals and the current signals supplied to the booster and dry pumps, respectively. Given the sorted time series of each state variable for the idle and gas loaded operation conditions, the two parameters sets corresponding to the upper and lower bounds are obtained by using equation (2). The estimated parameters sets of the upper and lower bounds are also used to examine what amount of the variation of each state variable is kept up under the repeated idle and gas-loaded operation conditions.

From FIGS. 5 and 6, the pump operation conditions observed daring five hours are seen to consist of seven operation steps, i.e. the four idle and three gas-loaded states. Table 1 shows the estimated parameter sets of the asymptotic upper and lower bounds for each operation conditions, i.e. the four states (idle state 1~4 in Table 1) and the three gas-loaded states (gas loaded state 1~3 in Table 1).

Table 1 shows the estimated parameter sets of the asymptotic upper and lower bounds for the four state variables (the inlet and exhaust pressure signals and the supply current signals of the booster and dry pumps). BP and DP denote the booster and dry pumps and that $a_U$ and $b_U$ denote the slop and initial values of the asymptotic upper bound curves and $a_L$ and $b_L$ do the slop and initial values of the asymptotic lower bound curves.

TABLE 1

| | | | Step 1 Idle State 1 0~15 [min] | Step 2 Gas-Loaded State 1 35~110 [min] | Step 3 Idle State 2 126~150 [min] | Step 4 Gas-Loaded State 2 170~200 [min] | Stage 5 Idle State 3 213~226 [min] | Stage 6 Gas-Loaded State 3 246~275 [min] | Stage 7 Idle State 4 286~298 [min] |
|---|---|---|---|---|---|---|---|---|---|
| | Pump Operation Conditions | | | | | | | | |
| Inlet Pressure [mbar] | Upper Bound | $a_U$ | −0.0012 | −0.037 | −0.0006 | −0.031 | −0.0011 | −0.012 | −0.0013 |
| | | $b_U$ | 0.56 | 21.04 | 0.59 | 19.19 | 0.60 | 17.76 | 0.60 |
| | Lower Bound | $a_L$ | −0.0006 | 0.0001 | −0.0006 | 0.0067 | −0.0011 | 0.0072 | −0.0019 |
| | | $b_L$ | 0.49 | 9.97 | 0.53 | 9.40 | 0.54 | 9.23 | 0.54 |

TABLE 1-continued

|  |  |  | Step 1 Idle State 1 0~15 [min] | Step 2 Gas-Loaded State 1 35~110 [min] | Step 3 Idle State 2 126~150 [min] | Step 4 Gas-Loaded State 2 170~200 [min] | Stage 5 Idle State 3 213~226 [min] | Stage 6 Gas-Loaded State 3 246~275 [min] | Stage 7 Idle State 4 286~298 [min] |
|---|---|---|---|---|---|---|---|---|---|
| Exhaust Pressure [mbar] | Upper Bound | $a_U$ | −0.029 | 0.0059 | −0.0032 | −0.0084 | −0.023 | 0.012 | 0.023 |
|  |  | $b_U$ | 1040 | 1049 | 1040 | 1049 | 1040 | 1049 | 1039 |
|  | Lower Bound | $a_L$ | 0.073 | 0.0022 | 0.056 | 0.0062 | −0.038 | −0.01 | −0.085 |
|  |  | $b_L$ | 1032 | 1038 | 1032 | 1038 | 1033 | 1038 | 1033 |
| BP Supply Current [A] | Upper Bound | $a_U$ | 0.002 | 0.0003 | 0.0031 | 0.0023 | 0.0009 | 0.0017 | 0.0032 |
|  |  | $b_U$ | 4.73 | 11.11 | 4.66 | 11.04 | 4.68 | 11.12 | 4.64 |
|  | Lower Bound | $a_L$ | 0.0018 | −0.0025 | 0.0027 | −0.0017 | 0.0023 | −0.0016 | 0.0031 |
|  |  | $b_L$ | 4.61 | 9.19 | 4.54 | 9.05 | 4.55 | 9.02 | 4.52 |
| DP Supply Current [A] | Upper Bound | $a_U$ | −0.0003 | −0.0008 | −0.0004 | 0.0021 | −0.0002 | 0.0026 | −0.0005 |
|  |  | $b_U$ | 16.2 | 15.8 | 16.2 | 15.7 | 16.1 | 15.7 | 16.2 |
|  | Lower Bound | $a_L$ | −0.0011 | −0.0002 | −0.0016 | 0.0017 | −0.0021 | 0.0021 | −0.0086 |
|  |  | $b_L$ | 16.0 | 15.4 | 16.0 | 15.3 | 16.0 | 15.3 | 16.0 |

Note that transient states between the idle and gas-loaded states were not used for the parameter estimation. The time interval used for the parameter estimation was specified to the third raw of Table 1. It is obvious from Table 1 that the operation characteristics of each state variable are described by six parameters: two time stamps Initial and final time), two model parameters (the slop and initial values) for the idle state, and two model parameters (the slop and initial values) for the gas-loaded state, respectively. They inform when the idle or gas loaded state occurs and what extent of the inlet gas pressure under the idle or gas-loaded state varies between the upper and lower bounds. Of course, the comparison of sequential idle states (i.e. odd numbered steps: step 1, step 3, step 5 and step 7 in Table 1) is shown to enable the quantitative analysis of their variation. Furthermore, the quantitative trend analysis between subsequent gas-loaded states (i.e. even numbered steps: step 2, step 4 and step 6) is also shown to be realizable by comparing their modal parameters. Such trend analysis for the other state variables, i.e., the exhaust pressure and the supply currents of the booster and dry pumps, is readily implemented by comparing their corresponding modal parameters as listed in Table 1. It is obvious that the proposed diagnostic methods presents an active algorithm of estimating the model parameters adaptive to the vacuum pump operation conditions and then exploits the fitted model parameters for the trend analysis of the measured state variables.

It is shown in this work that such trend analysis is made for the two separated idle and gas-loaded operation regions. As in FIGS. 5 and 6, the upper and lower bound levels of the four state variables, the inlet and exhaust pressures and the supply currents of the booster and dry pumps, are obviously dependent on the gas-loading conditions. Those mechanical and electrical state variables are generally regarded to be a class of static properties. Unlike those static properties, the mechanical vibration and acoustical noise signals that include high frequency components have been used as the state variables for the trend and diagnostic analysis.

FIGS. 7(a) and (c) show the root-mean-squared values of the vibration acceleration on the booster pump and the acoustical noise measured near the mid position between the booster and dry pumps. The frequency bandwidth of the vibration acceleration was chosen to be 10 Hz to 10 kHz and that of the acoustical noise signal to be 20 Hz to 20 kHz, respectively. Both signals were digitally sampled at the rate of 40.96 kHz. Each block of 4096 samples (equivalent to the interval of 100 ms) were used to calculate the root-mean-squared (rms) values shown in FIGS. 7(a) and (c). Each record of 600 rms values (equivalent to one minute interval) was used to sort out the maximum and minimum values of the vibration acceleration and acoustical noise levels (the thin solid lines) shown in FIGS. 7(b) and (d).

The model parameters of their asymptotic upper and lower curves were listed in Table 2. Table 2 shows the estimated parameter sets of the asymptotic upper and lower bounds for the vibration acceleration and acoustical noise levels and $a_U$ and $b_U$ denote the slop and initial values of the upper bound curves and $a_L$ and $b_L$ do the slop and initial values of the lower bound curves.

TABLE 2

|  |  |  | Step 1 Idle State 1 0~15 [min] | Step 2 Gas-Loaded State 1 35~110 [min] | Step 3 Idle State 2 126~150 [min] | Step 4 Gas-Loaded State 2 170~200 [min] | Stage 5 Idle State 3 213~226 [min] | Stage 6 Gas-Loaded State 3 246~275 [min] | Stage 7 Idle State 4 286~298 [min] |
|---|---|---|---|---|---|---|---|---|---|
| Vibration Level [m/s²] | Upper Bound | $a_U$ | −0.0162 | −0.0059 | −0.0117 | 0.0052 | −0.0063 | −0.0031 | −0.0287 |
|  |  | $b_U$ | 5.28 | 4.87 | 5.49 | 5.00 | 5.36 | 5.24 | 5.15 |
|  |  | Peak | 5.43 | 5.97 | 5.64 | 5.59 | 5.60 | 5.94 | 5.64 |
|  | Lower Bound | $a_L$ | −0.0217 | −0.0043 | −0.0073 | 0.0007 | −0.0149 | −0.0026 | −0.0172 |
|  |  | $b_L$ | 3.74 | 3.34 | 3.91 | 3.59 | 3.50 | 3.73 | 3.80 |
| Acoustical Noise | Upper Bound | $a_U$ | 0.0008 | 0.0010 | −0.0006 | 0.0016 | −0.0023 | 0.0014 | 0.0062 |
|  |  | $b_U$ | 0.97 | 0.99 | 0.97 | 0.98 | 0.98 | 1.04 | 0.93 |

TABLE 2-continued

|  |  | Step 1 Idle State 1 0~15 [min] | Step 2 Gas-Loaded State 1 35~110 [min] | Step 3 Idle State 2 126~150 [min] | Step 4 Gas-Loaded State 2 170~200 [min] | Stage 5 Idle State 3 213~226 [min] | Stage 6 Gas-Loaded State 3 246~275 [min] | Stage 7 Idle State 4 286~298 [min] |
|---|---|---|---|---|---|---|---|---|
|  | Pump Operation Conditions |  |  |  |  |  |  |  |
| Level [Pa] | Peak | 1.04 | 1.29 | 1.03 | 1.18 | 1.00 | 1.38 | 1.14 |
|  | Lower $a_L$ | −0.0001 | −0.0000 | −0.0004 | 0.0004 | −0.0017 | 0.0003 | −0.0001 |
|  | Bound $b_L$ | 0.61 | 0.61 | 0.61 | 0.60 | 0.61 | 0.60 | 0.60 |

Those model parameters were estimated from the seven stepped operation conditions (four idle operation states and three gas-loaded states) as given in Table 1. The vibration acceleration and acoustical noise levels in FIG. 7 are shown to not exhibit noticeable gas-load dependent characteristics unlike those of the inlet and exhaust pressures and the supply currents of the booster and dry pumps shown in FIGS. 5 and 6. The asymptotic lower bounds of the vibration acceleration and acoustical noise levels are shown to be quite even regardless to the gas loading conditions but their asymptotic upper bounds are shown to reveal the sign-changed (positive and negative) characteristics of the slope-related parameters. The gas-loaded operation conditions are seen to correspond to the positive slope but the first three idle states to correspond to the negative slope except the last idle operation region. One of the distinctive features shown in FIG. 7, i.e. fluctuating signal components, are observed from the upper bound levels. The peak values of the fluctuating components for the seven segmented operation steps, marked by the "circle" symbol in FIGS. 7(b) and (d), were chosen to be another diagnostic variable. Their levels and corresponding time stamps are also given in the Table 2. They are useful to judge what extent of excessive vibration and acoustic noise levels occurs daring each operation step. As a result, it makes it possible to identify what process the possible warning or alarm state happened to occur.

It is very interesting to note that the parameter set of the asymptotic upper and lower bounds for each state variable can reduce extremely the size of date used for the trend monitoring and diagnostic analysis. The present version of the e-diagnostics guideline [Reference 18: Harvey Wohlwend, e-Diagnostics Guidebook, International SEMATECH, Version 1.5, October, 2002] recommends that the minimum sampling rate for each state variable is set to be 10 Hz (10 samples per second) or higher. The sampling rate in this work was chosen to be 10 Hz according to the e-diagnostics guideline. As commented previously, the sampled signals for five hours were chosen in this work. The total number of samples for each state variable is found to be equal to 180,000. To the contrary, the fitted model parameters and their time stamps for each static state variable are found to be only 42 data (7 sets of four model parameters and 7 sets of initial and final time stamps). When a dynamic state variable is considered fourteen additional data (7 set of peaks and corresponding time stamps) are added to them. This diagnostic data reduction rate is extremely high. It enables the implementation of trend monitoring and diagnostic system by using the very compact-sized digital signal processors such as the TI's model of TMS320C2000 series [Reference 19: Data Manual for TMS320LF2407, TMS320LF2406, TMS320LF2402 Digital Signal Processors, Literature Number: SPRS094I, September 2003; Reference 20: Data Manual for TMS320F2810, TMS320F2811, TMS320F2812, TMS320C2810, TMS320C2811, TMS320C2812 Digital Signal Processors, Literature Number: SPRS174J, December 2003].

2. In-Situ Estimation Method for Pumping Speed

In the previous sub-section, the active algorithm of estimating the model parameters adaptive to the operation conditions of the vacuum pumps has been in details addressed. It is shown that the model parameter of the asymptotic upper and lower bounds are estimated for the separated idle and gas-loaded operation conditions. A logical way of separating the pump operation conditions is introduced in this subsection. Once the inlet pressure was directly measured in this work, it is natural to use it for such separation. When a semiconductor fabrication process keeps going in the reaction chamber, the inlet pressure level of the vacuum pumps remains above the minimum level due to the gas flow supplied from the reaction chamber. The minimum level, referred to the threshold level in this work, was found to depend on the process gases and related products. For instance, the threshold level of the inlet pressure signals observed form FIG. 5(a) was above 9 [mbar]. This work selected safely the threshold level of 5 [mbar] to separate the idle and gas loaded operation conditions. This safe selection has never made any fault decision. This work defines as the transient region the time interval ranging from the ten seconds before the threshold level to the ten seconds after the threshold level. The inlet pressure signals sampled in the transient region will be later shown to play a critical role in estimating the pumping speed related parameters. Even if the inlet pressure signal is not measured directly, the separation of the pump operation conditions is not inhibited. The use of either the supply current signals or the exhaust pressure signal shown in FIG. 5 enables the selection of the threshold level in the same way as done for the inlet pressure signal. This work proposes the use of the supply current signal of the booster pump as the second choice for the separation of the pump operation conditions since the supply current signal of the booster pump has closer similarity to the inlet pressure signal than the exhaust pressure signal or the supply current signal of the vacuum pumps, as shown in FIGS. 5(b)~(d). But, the use of the exhaust pressure is seen to require electrically well-tuned amplifier and noise filter circuits to minimize fault separation as small as possible. The proposed methods of separating the idle and gas-loaded operation conditions are one of distinctive achievements contributed by this work.

Two kinds of inlet pressure transition regions, i.e. positive-going and negative-going ones, are observed from FIG. 5(a). The positive-going transition of the inlet pressure occurs when the outlet valve of the reaction chamber is opened at the beginning of the process stage and the negative-going one does when the outlet valve is closed after the end of the process stage. This work exploits the inlet pressure signals measured in the negative-going transition region since their signal characteristics are smooth.

FIG. 8 illustrates the inlet pressure signal of the first negative going transition region existing between the first gas-loaded operation region and the second idle region and, in this figure, the thick solid line indicates the fitted model of the exponentially decaying function.

On the onset of this work, it was apparent that the exponential decay characteristics of the inlet pressure signal shown in FIG. 8 is directly related to the pumping speed of the installed vacuum pump. The fundamental relationship of pumping speed and pump-down times, well known in the vacuum theory [Reference 21: Nigel. S. Hariss, Modern Vacuum Practice, McGraw-Hill Book Company, Lendon: England 1989], is exploited in this work. The algebraic equation is given as $$P_n = P_0 \cdot e^{-\alpha \cdot n}, \; \alpha = 2.77 \times 10^4 \cdot \frac{Q}{V} \cdot \Delta T \qquad \text{MathFIG. 4}$$

In equation (4), the symbols Q and V denote the pumping speed [m$^3$/h] and the volume [m$^3$] to be evacuated The symbol $\Delta T$ denotes the sampling period in second ($\Delta T$=100 [ms] in this work). The symbol alpha in equation (4) is the exponential decay constant whose value is directly related to the pumping speed. The formula assumes a constant pumping speed over the pressure range between the initial value $P_0$ and the final level $P_n$. As a result, the adequate range for the initial and final inlet pressure levels are determined by selecting the linear region on the semi-log plot shown in FIG. 8. The thick solid lines indicate the two selected regions for the initial and final positions used to estimate the two exponential decay constants at the different pressure regions. The initial and final pressure levels in the first region were selected to be the 80% and 20% levels of the inlet pressure observed before the continuous gas flow stopped. Both levels in the second region were also selected to be the 9% and 7% levels, respectively. These guidelines of selecting two different regions are found to be very stable and effective to estimate the exponential decay constants. The estimated exponential decay constants are exploited to examine what extent of the pumping speed performance is decreased as the fabrication process keeps going.

It is quite straightforward to estimate the best-fitted exponential decay constant corresponding to the selected region. Let {Pn: n=1, ..., N} be the inlet pressure signals sampled in the selected region. Their logarithm values of the inlet pressure signals are obtained as $$y_n = -\alpha \cdot n + \beta, \; y_n = \ln(P_n) \text{ and } \beta = \ln(P_0) \qquad \text{Math Figure 5}$$

The estimation of the best-fitted parameters alpha and beta is obtained by using the least squared method addressed in the previous sub-section, as given in equation in (2). The best-fitted exponential decay constants for the two different regions are used to evaluate the approximate pumping speed indicators, which is defined as the pumping speed per unit volume, that is $$I_P = \frac{Q}{V} = 3.6 \times 10^4 \cdot \alpha \qquad \text{MathFIG. 6}$$

Table 3 illustrates the estimated exponential decay constants and their corresponding estimated pumping speed indicators for the three consecutive negative-going regions of the inlet pressure shown in FIG. 5(a) and in this table, the symbols alpha and Ip denote the exponential decay constant and the pumping speed indicator, respectively.

TABLE 3

| Two Model-Fitted Regions | | First Negative-going Transition | Second Negative-going Transition | Third Negative-going Transition |
|---|---|---|---|---|
| First Region | $\alpha$ | 0.0856 | 0.0849 | 0.0831 |
|  | $I_P$ | 3081 | 3056 | 2991 |
| Second Region | $\alpha$ | 0.0059 | 0.0057 | 0.0051 |
|  | $I_P$ | 212 | 205 | 153 |

The in-situ method which has been proposed in this work to evaluate the pumping speed indicators by using the measured inlet pressure signals, is very significant since it provide appropriate information for the pump maintenance engineers to decide whether the vacuum pump of interest should be replaced or not by judging what extent of the pumping speed has decreased so far. The proposed in-situ estimation method of the pumping speed indicators is quite a unique one that is not yet discovered even in the recent pump diagnostic technologies [Reference 1-4, Reference 6-9].

3. Trend Monitoring and Diagnostic Methods Using Model Parameters

In the previous two sub-sections, the six state variables considered are the inlet and exhaust pressures, the supply currents of the booster and dry pumps, the mechanical vibration and acoustical noise signals, and the pumping speed indicator. The active algorithm of estimating the model parameters adaptive to the operation conditions of the vacuum pumps has been shown to provide the best fitted model parameters $\{a_U, b_U, a_L, b_L\}$ for each idle state and for each gas loaded operation condition, respectively. As introduced in Sub-section 2, a peak value among the sorted maximum values collected every minute, denoted by {VU,PK}, is also added to the four model parameters for each (idle or gas-loaded) operation condition. As a result, the five parameters $\{a_U, b_U, a_L, b_L, VU, PK\}$ for each state variable are a representative data set for each (idle or gas-loaded) operation condition. As the fabrication process keeps going, a series of the five parameters for all the considered state variables are describes in a form of two-dimensional matrix $$\{p_{Idle}(n,(j-1)\times 5+k), \; p_{Load}(n,(j-1)\times 5+k)\} \quad \text{for} \quad n=1,\ldots; j=1,\ldots,7; k=1,\ldots,5 \qquad \text{Math Figure 7}$$

Note that the subscript symbols (Idle and Load) denote the idle and gas-loaded operation conditions. The raw index n denotes the sequence of fabrication processes. The column indices j and k denote the classification number of the seven state variables and the order of the five parameters for each state variable. The seventh state variable corresponds to the mechanical vibration signal measures on the dry pump although it is not illustrated in Section 1. The pumping speed indicator, if needed may be included in the last column of the matrices. The choice of the classification number and the parameter order is made in any convenient way. When either the idle state or the gas-loaded operation state is carried out, its corresponding raw vector is obtained As the idle and gas-loaded operations are repeated the two matrixes are obtained.

The matrix data, described in equation (7), are readily used for the trend monitoring and diagnostic analysis of the considered vacuum pump by using the well known analysis methods: Single-variable or multi-variable statistical analysis, the process capability analysis [Reference 22: Z. G.

Stoumbos, "Process capability indices: Review and extensions," Nonlinear Analysis: Real World Applications, Vol. 3, pp. 191-210, 2002], and the Mahalanobis distance analysis [Reference 11]. Actually in the previous sub-sections, the concept underlying behind the single-variable statistical analysis had been exploited to illustrate how well the estimated model parameters can be used for the trend monitoring and diagnostics of the vacuum pumps. The illustrated contents and logical sequences in the previous sub-sections are well matched with the single-variable statistical analysis. But the multi-variable analysis, including the process capability analysis and the Mahalanobis distance analysis, has been not yet considered so far because their technical discussions are beyond the scope of this work. This work prefers to the Mahalanobis distance analysis rather than the multi-variable analysis and the process capability analysis. The reason is it that it has always provided us with more sensitive responses to the small variation of the estimates model parameters. The matrix data, which consists of the best-fitted model parameters for the dynamic characteristics imbedded in the measured state variables, is shown to lead to another effective way for the trend and diagnostic analysis of the vacuum pumps. This transplantation of the model parameter structured data matrixes to such conventional analysis algorithms (the multi-variable statistical analysis, the process capability analysis, and the Mahalanobis distance analysis) is surely one of the achievements contributed by this work.

INDUSTRIAL APPLICABILITY

The present invention such as active diagnostic algorithms is developed not only to realize the early detection of degraded vacuum pumps for the protection of pump failure but also to provide their predictive maintenance.

According to the present invention, it is possible to find simple and effective ways to deal with technical problems arising from the large variability of the pump-by-pump operation characteristics and the multiple process conditions, especially in semi-conductor manufacturing process.

The invention claimed is:

1. A trend monitoring and diagnostic analysis method for the failure protection and predictive maintenance of a vacuum pump running under idle and gas-loaded operation conditions alternately, comprising the steps of:

sampling the time series of the state variables signals at the predetermined rate for the idle and gas-loaded operation conditions;

sorting out the maximum and minimum values of the time series of the state variables from each segmented set of consecutively sampled signals being longer than the period of fluctuating state variable signal components for the idle and gas-loaded operation conditions;

estimating the one set of the best-fitted model parameters of the asymptotic upper bound from the sorted maximum values of each state variable and the other set of the best-fitted model parameters of the asymptotic lower bound from the sorted minimum values of each state variable, by using a linear parametric model-based active diagnostic algorithm, for the idle and gas-loaded operation conditions;

evaluating the pumping speed indicator based on a inlet pressure signal by using the in-situ estimation method whenever the transition state from the gas-loaded operation condition to the idle one is observed;

storing the estimated upper and lower model parameters of the asymptotic upper and lower bounds of all considered state variables for each idle and gas-loaded operation condition and the evaluated pumping speed indicator whenever the transition state from the gas-loaded operation condition to the idle one is observed;

repeating the estimation of model parameters of the upper and lower bounds of each state variable for the idle and gas-loaded operation conditions and the evaluation of the pumping speed indicator; and monitoring the variation trend from the estimated upper and lower model parameters of all considered state variables collected for the consecutive idle operation conditions and from those of all considered state variables collected for the consecutive gas-loaded operation conditions and from the consecutively collected pumping speed indicators from the repeated transitions from the gas-loaded operation state to the idle state, and diagnosing whether the vacuum pump is abnormal or not on the basis of the variation trend analysis results thereof.

2. The method according to claim 1, wherein the vacuum pump is used in semi-conductor fabrication processes.

3. The method according to claim 1, wherein the state variables comprise the inlet and exhaust pressure signals, the supply currents of the booster and dry pumps, the root-mean-squared mechanical vibration levels on the booster and dry pumps, and the root-mean- squared acoustical noise levels near the mid position between the booster and dry pumps.

4. The method according to claim 3, in the case of the root-mean-squared mechanical vibration levels on the booster and dry pumps, and the root-mean-squared acoustical noise levels near the mid position between the booster and dry pumps, said method further comprises the step of estimating peak values of the mechanical vibration and acoustical noise signals for the idle and gas-loaded operation conditions.

5. The method according to claim 1, wherein the in-situ evaluation method involves measuring the inlet pressure signal in a similar way to the pump down test method where the negative-going transition of the inlet pressure is used to evaluate the pumping speed.

6. The method according to claim 1, wherein the pumping speed indicator is defined as the pumping speed per unit volume, that is $$I_P = \frac{Q}{V} = 3.6 \times 10^4 \cdot \alpha$$

where the symbols Ip and alpha denote the pumping speed indicator and the exponential decay constant and the symbols Q and V denote the pumping speed and the volume to be evacuated; and the exponential decay constant is obtained from the logarithm values of the inlet pressure signals {Pn: n=1, ..., N} corresponding to the negative going transition region of the inlet pressure as $$y_n = -\alpha \cdot n + \beta, \ y_n = 1n(P_n) \text{ and } \beta = 1n(P_o)$$

where the estimation of the best-fitted exponential decay constant alpha and the initial value beta is obtained by using the least squared method.

7. The method according to claim 1, wherein the parametric linear model for describing the upper and lower asymptotic bounds for each sampled state variable is given as $$y_{k,n} = a_k \cdot n + b_k$$

where the subscript k denotes the upper or lower asymptotic models {k=U or L}; and the two sets of upper and lower model parameters {$a_k, b_k$: k=U or L} for each state variable are obtained by using the least square method as follows:

$$a_k = \frac{N \cdot \sum_{n=1}^{N} n \cdot y_{k,n} - \sum_{n=1}^{N} n \cdot \sum_{n=1}^{N} y_{k,n}}{N \cdot \sum_{n=1}^{N} n^2 - \left(\sum_{n=1}^{N} n\right)^2},$$

$$b_k = \frac{\sum_{n=1}^{N} n^2 \cdot \sum_{n=1}^{N} y_{k,n} - \sum_{n=1}^{N} n \cdot \sum_{n=1}^{N} n \cdot y_{k,n}}{N \cdot \sum_{n=1}^{N} n^2 - \left(\sum_{n=1}^{N} n\right)^2}$$

where the first parameters $\{a_k: k=U \text{ or } L\}$ are the slopes of the upper and lower bounds and the second parameters $\{b_k: k=U \text{ or } L\}$ are the initial values of the upper and lower bounds.

8. The method of according to claim 1, wherein determining the transition state from the gas-loaded operation condition to the idle operation condition is implemented by monitoring the threshold level of the inlet pressure level.

9. The method of according to claim 1, wherein determining the transition state from the gas-loaded operation condition to the idle operation condition is implemented by monitoring the threshold level of either the supply current level of the booster pump or the exhaust pressure signal.

10. The method according to claim 1, wherein the steps of the variation trend monitoring and diagnosing of the considered vacuum pump are performed using the pair of two-dimensional structured data matrices which comprise the estimated model parameters and the peak value of each state variable obtained from each idle or gas-loaded operation condition as follows:

$$\{p_{idle}(n,(j-1)\times K+k)\} \text{ and } \{p_{Load}(n,(j-1)\times K+k)\}$$

for n=1, . . . ;
j=1, . . . , J (total number of sampled state variables);
k=1, . . . , K (total number of estimated model parameters)
wherein the subscript symbols "Idle" and "Load" denote the idle and gas-loaded operation conditions and the raw index n denotes the sequence of fabrication processes and the column indices j and k denote the classification number of the state variables and the order of the estimated model parameters for each state variable.

11. A trend monitoring and diagnostic analysis system for the failure protection and predictive maintenance of vacuum pumps running under the multiple processes including idle and gas-loaded operation conditions alternately, comprising:

data acquisition unit for sampling the time series of the state variables signals at the predetermined rate for the idle and gas-loaded stages in a real-time; and signal processing unit provided with calculation and storage means for the measured signals from the data acquisition unit, and said signal processing unit being characterized in that it provides the steps of:

sorting out the maximum and minimum values of the time series of the state variables from each segmented set of consecutively sampled signals being longer than the period of fluctuating state variable signal components for the idle and gas-loaded operation conditions;

estimating the one set of the best-fitted model parameters of the asymptotic upper bound from the sorted maximum values of each state variable and the other set of the best-fitted model parameters of the asymptotic lower bound from the sorted minimum values of each state variable for each idle and gas-loaded operation condition;

evaluating the pumping speed indicator based on a inlet pressure signal by using the in-situ estimation method whenever the transition state from the gas-loaded operation condition to the idle one is observed;

storing the estimated upper and lower model parameters of the asymptotic upper and lower bounds for each state variable and the evaluated pumping speed indicator;

monitoring the variation trend from the estimated upper and lower model parameters of all considered state variables collected for the consecutive idle operation conditions and from those of all considered state variables collected for the consecutive gas-loaded operation conditions and from the consecutively collected pumping speed indicators from the repeated transitions from the gas-loaded operation state to the idle state, and diagnosing whether the vacuum pump is abnormal or not on the basis of the variation trend analysis results thereof.

* * * * *